Oct. 13, 1931.                C. GOTTWALD                1,826,877

FITTING FOR CONDUIT SYSTEMS

Filed Aug. 12, 1927

Inventor
Christian Gottwald
By Kwis Hudson & Kent.
Attorney

Patented Oct. 13, 1931

1,826,877

UNITED STATES PATENT OFFICE

CHRISTIAN GOTTWALD, OF CLEVELAND, OHIO, ASSIGNOR TO THE RIC-WIL COMPANY, OF CLEVELAND, OHIO, A CORPORATION OF OHIO

FITTING FOR CONDUIT SYSTEMS

Application filed August 12, 1927. Serial No. 212,503.

The present invention relates to conduits in which pipes for various purposes may be contained, and particularly finds use in the laying of such pipe and conduit in cities, beneath streets, etc.

The particular invention herein described relates to what may be termed a service fitting, the same being adapted to receive a branch pipe from the main pipe line, the branch pipe being piped into a building for instance.

The object of the invention is to provide a fitting giving a right angle connection in which the conduit housing the branch pipe is located, preferably above the main pipe line.

The depth of the branch connections, in a conduit line such as above referred to, must be a certain distance below the street surface, usually about two feet and the herein described fitting permits a closely coupled connection, and thereby permits the use of a trench of minimum depth for the main line of conduit.

Heretofore it has been customary under such circumstances to use an elbow T conduit fitting, but with the herein proposed type of fitting the connection to the main steam pipe or other pipe is much more advantageously made, and furthermore the conduit for the branch pipe line is quite independent and out of the way of the conduit housing the main pipe line.

Furthermore, the sections making up the fitting for the herein described fitting may be shipped in disassembled condition, so that there is little or no likelihood of breakage, which is more likely to take place where the conduit is prepared in T form.

Reference should be had to the accompanying drawings forming a part of this specification in which, Figure 1 is an elevation of a main line and branch line conduit embodying the present invention.

Figure 1:
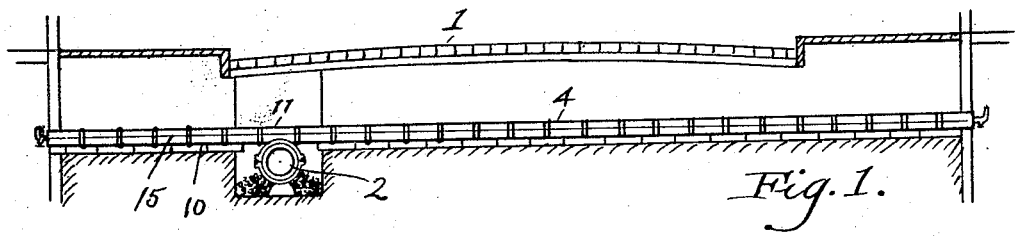
Figure 2:
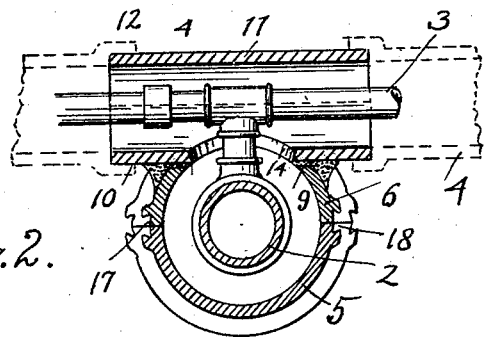
Figure 2 is a sectional elevation of the conduit fitting.
Figure 3:
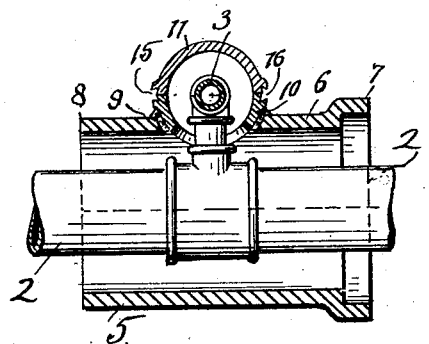
Figure 3 is a sectional elevation of the showing in Figure 2.

In the drawings the pavement or street is indicated at 1, and at 2 is indicated a main pipe line which is installed beneath the pavement, a trench usually being dug and subsequently filled in in placing the main line. The pipe 2 is universally housed in some form of protecting conduit which, so far as this invention is concerned, may be of the tile conduit.

At 3 is indicated a branch pipe line leading off from the main line, as for instance, a service piping for connecting steam to buildings. The connection between the main pipe 2 and the branch pipe 3 may be effected by ordinary couplings. The branch pipe line 3 would also be encased in suitable protecting tile such as indicated at 4; and so far as this application is concerned such tile may be the usual bell and spigot type of tile.

The fitting by which the conduit forming the encasing means for the main line of pipe is connected with the conduit forming the encasing for the branch line of pipe is described and claimed. This fitting comprises a lower conduit section 5 and an upper conduit section 6, these conduit sections being split longitudinally along their central plane. These sections 5 and 6 when assembled having a bell end 7 and a spigot end 8, thus adapting them for cooperation with sections of a bell and spigot type of conduit.

The upper section 6 has a cut-away portion, as indicated at 9, adapted to receive the cylindrical portion of a right angled conduit, which is likewise formed in two sections, 10 and 11. These two sections 10 and 11 form, when assembled, a complete conduit section known as a ring pipe conduit.

The lower section 6 has an opening therethrough, as indicated at 14, of sufficient extent to cooperate with the opening 9 formed in section 6. The portions of the walls of section 6 engage with the wall of the section 10 and are cemented so as to form a water-tight joint. The upper section 11 of the upper conduit is cemented in place, preferably by introducing cement into the grooves 15 and 16, these grooves being formed by overhanging reentrant lips formed by the sections 10 and 11. The sections 5 and 6 of the lower conduit are likewise secured together by introducing cement into the grooves 17 and 18.

It will be seen that in making a branch line connection to a main pipe line the main pipe line may be assembled with respect to the lower section 5 of the conduit which encases it, then the connection for the branch pipe line may be made, then the upper half of the lower conduit section may be placed, followed by placing and cementing the lower section of the branch line conduit, and then subsequently placing the top of the branch line conduit. This provides a much more efficient and simple method of construction than is possible with the usual T type of conduit.

Furthermore, there is a decided advantage in being able to build up this type of conduit fitting at the time when it is put in place, for the several parts may be very advantageously shipped separate, whereas if they were shipped in assembled condition they would be much more liable to breakage.

Having thus described my invention what I claim as new is:

1. In combination with intersecting conduits having pipes therein, a part of each conduit having an opening, said parts being separate from each other but adapted to be joined with said openings in register, means for connecting said pipes through said registering openings.

2. In combination with intersecting conduits having pipes therein, means forming a segmental section for each conduit and adapted to be built thereinto adjacent the other conduit, said means also forming a common opening in said conduits, and means establishing communication between said pipes through said common opening.

In testimony whereof, I hereunto affix my signature.

CHRISTIAN GOTTWALD.